US008002007B2

(12) United States Patent
Sasaki

(10) Patent No.: US 8,002,007 B2
(45) Date of Patent: Aug. 23, 2011

(54) PNEUMATIC RADIAL TIRE FOR HEAVY LOADS

(75) Inventor: Akira Sasaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 772 days.

(21) Appl. No.: 11/997,257

(22) PCT Filed: Jun. 20, 2006

(86) PCT No.: PCT/JP2006/312322
§ 371 (c)(1),
(2), (4) Date: Jan. 29, 2008

(87) PCT Pub. No.: WO2007/015341
PCT Pub. Date: Feb. 8, 2007

(65) Prior Publication Data
US 2010/0089513 A1 Apr. 15, 2010

(51) Int. Cl.
*B60C 15/00* (2006.01)
*B60C 15/06* (2006.01)

(52) U.S. Cl. ........ 152/539; 152/542; 152/543; 152/546; 152/555

(58) Field of Classification Search .......... 152/539, 152/540, 541, 542, 543, 544, 545, 546, 547, 152/555
See application file for complete search history.

(56) References Cited

U.S. PATENT DOCUMENTS

| 2,934,126 A | 4/1960 | Wilson |
| 4,953,605 A | 9/1990 | Kawamura et al. |
| 5,033,524 A * | 7/1991 | Ohtsuka ........................ 152/542 |
| 5,460,214 A | 10/1995 | Fujita et al. |
| 5,979,528 A | 11/1999 | Miyazono |
| 6,276,417 B1 * | 8/2001 | Honbo et al. ................. 152/540 |

(Continued)

FOREIGN PATENT DOCUMENTS

EP 0 774 368 A1 5/1997

(Continued)

OTHER PUBLICATIONS

Mechanics of Pneumatic Tires, Aug. 1981, p. 881.*

(Continued)

*Primary Examiner* — Justin Fischer
(74) *Attorney, Agent, or Firm* — Sughrue Mion, PLLC

(57) ABSTRACT

There is provide a pneumatic radial tire for heavy loads capable of more effectively preventing a breakdown due to separation of a rubber chafer in an area corresponding to a bead heal portion than before. A pneumatic radial tire 10 for heavy loads has a pair of bead portions 12, a bead core 14 which is embedded in each of the bead portions 12, a radial carcass 16 extending from one bead portion 12 to the other bead portion 12 and turned around the bead core 14 from an inner side to an outer side of the bead portion 12 in a width direction of the tire to be anchored, a rubber chafer 22 disposed over the radial carcass 16 in the opposite side of the bead core 14. An angle θ formed by a steel cord 24S of the wire chafer 24 provided inside of the bead portion 12 outside of the radial carcass 16 and a carcass ply cord 16S of the radial carcass 16 is optimized depending on shear strain generated in the rubber chafer 22 so as to effectively preventing a breakdown of the rubber chafer 22 due to separation in an area corresponding to a bead heal portion 26.

10 Claims, 4 Drawing Sheets

U.S. PATENT DOCUMENTS 6,345,657 B1 * 2/2002 Kato .............................. 152/540
6,354,351 B1 * 3/2002 Miyazono .................... 152/543

FOREIGN PATENT DOCUMENTS

| | | |
|---|---|---|
| EP | 0 997 325 A1 | 5/2000 |
| EP | 1 346 853 A1 | 9/2003 |
| JP | 4-43108 A | 2/1992 |
| JP | 5-178039 A | 7/1993 |
| JP | 6-166307 A | 6/1994 |
| JP | 7-164838 A | 6/1995 |
| JP | 11-1107 A | 1/1999 |
| JP | 11-20423 A | 1/1999 |
| JP | 11-91321 A | 4/1999 |
| JP | 2001-206027 A | 7/2001 |
| JP | 2004-189192 A | 7/2004 |

OTHER PUBLICATIONS

Supplementary European Search Report dated Jun. 5, 2009 (7 pages).
Japanese Office Action dated May 17, 2011 issued in corresponding Japanese Patent Application No. 2007-529193.

* cited by examiner

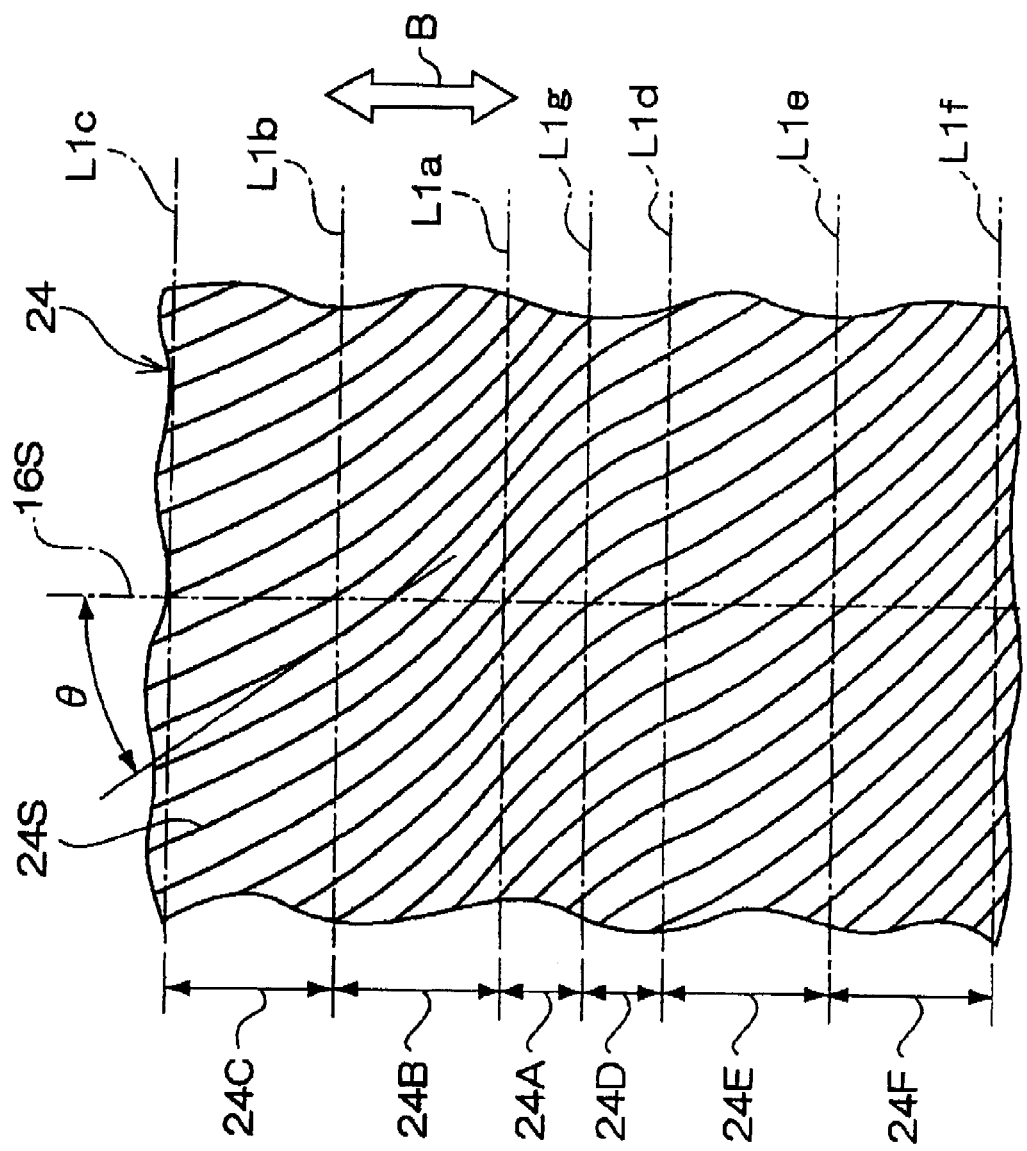

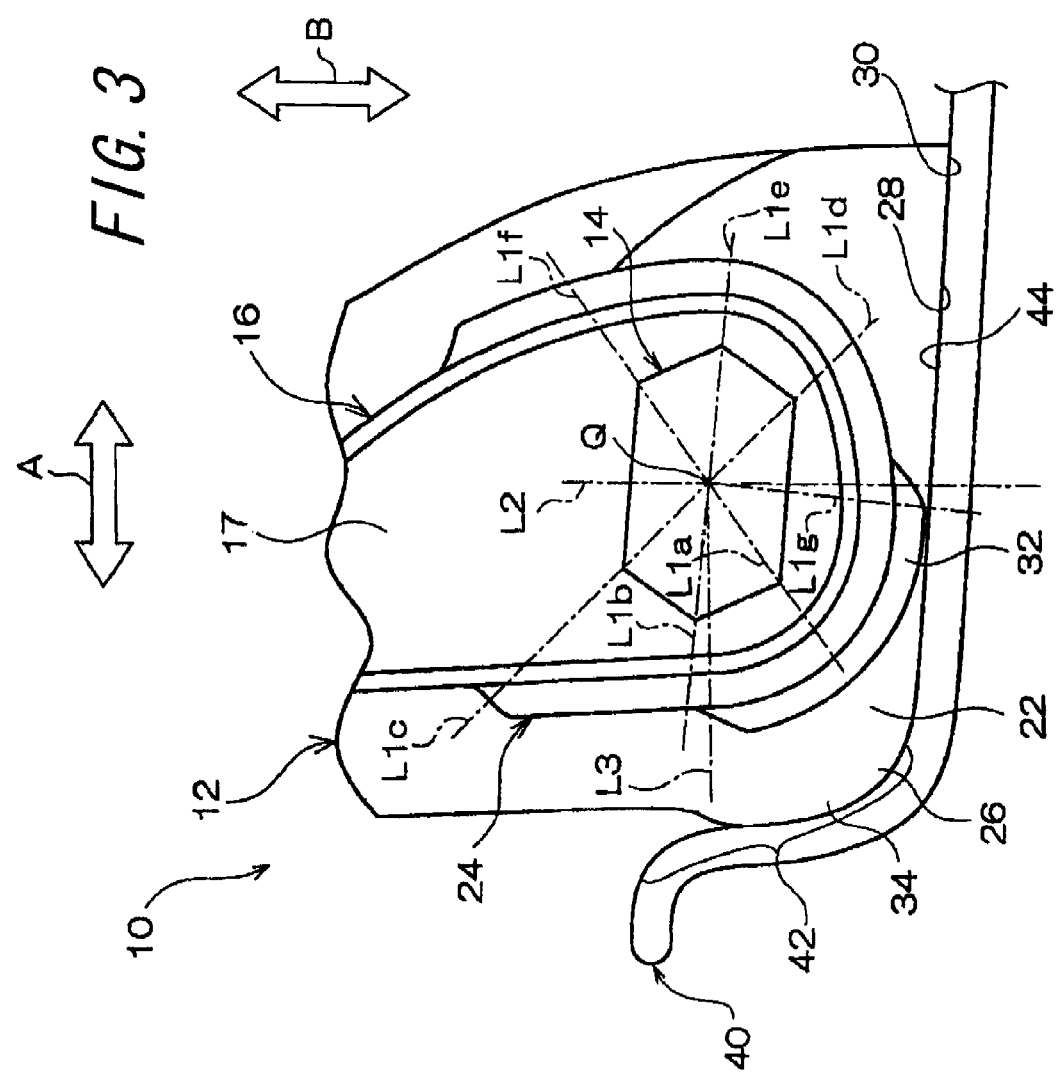

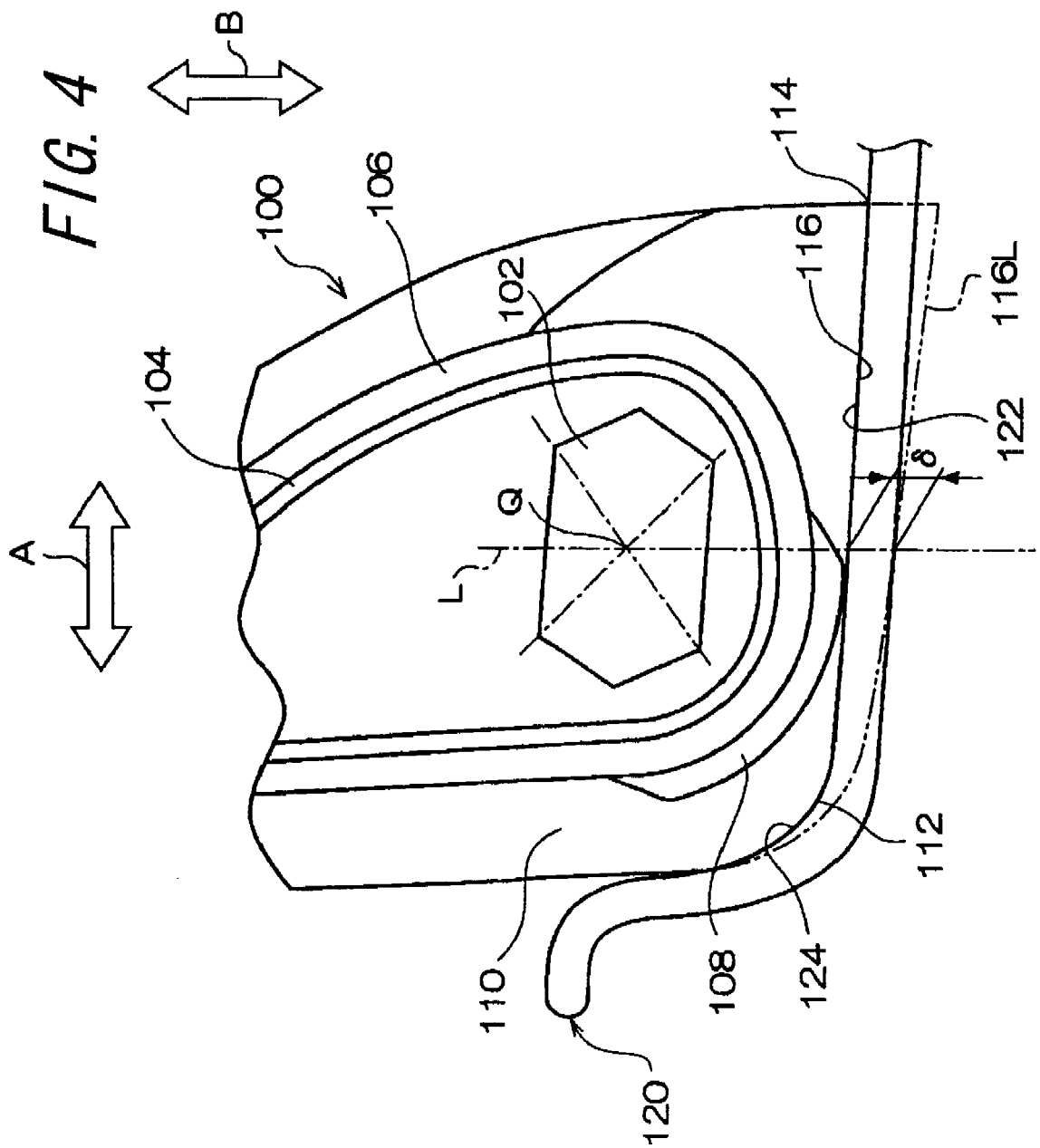

PNEUMATIC RADIAL TIRE FOR HEAVY LOADS

TECHNICAL FIELD

The present invention relates to a pneumatic radial tire for heavy loads and particularly relates to a pneumatic radial tire for heavy loads effectively preventing a breakdown due to separation occurring in an area corresponding to a bead heal portion when the tire is rotated under a load.

RELATED ART

A conventional pneumatic radial tire for heavy loads used in a vehicle driving the tire with a large force such as a construction vehicle is subjected to a large load when rotated under heavy loads. Thus, as shown in FIG. 4, a sufficient fastening margin δ of a bead portion 100 with respect to a bead sheet portion 122 of a rim 120 is required to be provided in order to prevent the bead portion 100 from sliding with respect to the rim 120. The fastening margin δ as used herein indicates a dimension how much a bead base portion 116 is apparently compressed to be fitted into the bead sheet portion 122 of the rim 120 when the tire is mounted on the rim 120. Compressing the bead base portion 116 in this way makes it possible to maintain airtightness between the tire and the rim as well as to prevent unforeseen slide between them. In FIG. 4, the fastening margin δ is a distance between an intersection of a virtual line 116L (two-dot chain line) indicating the state of the bead base portion 116 before the tire is mounted on the rim and a linear virtual line L (dot chain line) extending from a gravity center Q of a bead core 102 in the radial direction of the tire, and an intersection of the bead base portion 116 after the tire is mounted on the rim and the virtual line L.

However, since a sufficient fastening margin δ is provided, when the tire is mounted on the rim 120, the bead base portion 116 is expanded in the radial direction, that is, a rubber chafer 110 corresponding to the bead base portion 116 is apparently compressed (since rubber is noncompressible). As a result, most rubber of the rubber chafer 110 is fluidly deformed to flow in each direction of the bead heal portion 112 side and the bead toe portion 114 side. Particularly in the bead heal portion 112 side, the fluid deformation of the rubber is restricted by a rim flange 124 so that the rubber is fluidly deformed to flow outwardly in the radial direction of the tire. Such fluid deformation of the rubber chafer 110 is blocked by an reinforcing cord layer adjacent to the rubber chafer 110 in the bead core 102 side such as a wire chafer 106 to cause shear strain of the rubber chafer 110.

In addition, as the tire receives larger load when rotated, the rubber chafer 110 increases its fluid deformation and thus increases the shear strain. Therefore, there has been a problem that a breakdown due to separation is easily generated at a boundary surface between the rubber chafer 110 and the wire chafer 106 in an area corresponding to the bead heal portion 112 where the largest shear strain of the rubber chafer 110 is generated. It has been confirmed that most of such breakdowns due to separation are caused by an internal breakdown of coating rubber of a radial carcass 104 or the wire chafer 106 adjacent to the rubber chafer 110.

JP-A-2001-206027 describes a pneumatic radial tire in which a deformation absorbing rubber layer 108 having hardness less than that of the rubber chafer 110 and larger than those of coating rubber of the radial carcass 104 and the wire chafer 106 is provided at the boundary surface between the rubber chafer 110 and the wire chafer 106 in an area corresponding to a bead heel portion 112 so as to prevent a breakdown due to separation of the rubber chafer 110 in the area corresponding to the bead heal portion 112.

DISCLOSURE OF THE INVENTION

A vehicle exerting larger power such as a construction vehicle having a load factor defined by the TRA standard of 1.7 or more is being introduced into the market. Therefore, tire design for such a vehicle exerting further larger power with adopting only the means for arranging the deformation absorbing rubber layer in the pneumatic radial tire and means for suppressing fluid deformation of rubber by adjusting hardness of a rubber chafer, which are disclosed in JP-A-2001-206027, begins to reach a limit.

Accordingly, further improvement for effectively preventing a breakdown due to separation of the rubber chafer in an area corresponding to the bead heal portion is demanded.

It is, therefore, an object of the present invention to provide a pneumatic radial tire for heavy loads capable of more effectively preventing a breakdown due to separation of a rubber chafer in an area corresponding to a bead heal portion than before in view of the above-mentioned facts.

A pneumatic radial tire for heavy loads according to claim 1 of the present invention comprises a pair of bead portions in each of which a bead core is embedded, a radial carcass extending from one bead portion to the other bead portion and turned around the bead core from an inner side to an outer side of the bead portion in a width direction of the tire to be anchored, and a rubber chafer disposed over the radial carcass in the opposite side of the bead core and extending at least from the inner side of the bead core in the width direction of the tire toward a side portion of the tire, wherein a cross-sectional shape of the bead core in the width direction of the tire is a polygon having a first side part located innermost in a radial direction of the tire and a second side part radially outwardly extending from a first end part which is an outer end of the first side part in the width direction of the tire, an angle formed by a bead sheet portion of a regular rim and the first side part when the tire is mounted on the regular rim is within 2 degrees, a wire chafer is provided at a region around an outer side of the radial carcass corresponding to a first section and a second section as viewed in the width direction of the tire, the first section lying at least from a central part of the first side part in the width direction of the tire to the first end part and the second section lying from the first end part to a second end part which is an outer end of the second side part in the radial direction of the tire, and an angle θ formed by a cord of the wire chafer and a cord of the radial carcass is within a range between 35 degrees and 60 degrees in the first section and within a range between 40 degrees and 65 degrees in the second section.

Conventionally, the wire chafer is a reinforcement provided for assuring bending stiffness of the bead portion in the radial direction and the angle θ formed by the cord of the wire chafer and the cord of the radial carcass is unambiguously determined in view of the bending stiffness of the bead portion in the radial direction.

The inventor comes up with an idea that the binding force of the wire chafer can be optimized by adjusting said angle θ of the wire chafer depending on the amount of shear strain generated in the rubber chafer. Therefore, the inventor reaches a conclusion that the binding force of the wire chafer can be optimized to prevent shear strain of the rubber chafer and eventually to effectively prevent a breakdown due to separation of the rubber chafer.

Next, the operation and effect of the pneumatic radial tire for heavy loads according to claim 1 will be described. Among the bead portion, the rubber chafer receives the largest shear strain in an area corresponding to the bead heel portion and therefore, it is required to optimize a biding force of the wire chafer in this area. In addition, the binding force of the wire chafer is reduced when the angle θ formed by the cord of the wire chafer and the cord of the radial carcass is either too small or close to 90 degrees.

Since the angle formed by the first side part of the bead core and the bead sheet portion of the regular rim is within 2 degrees, the first side part and the bead sheet portion is generally parallel to each other and the first end part of the bead core is generally directed to the bead heel portion side. Therefore, the rubber chafer receives the largest shear strain in the area corresponding to the first and second sections consisting of the first and second end parts (that is, the first and second sections correspond to the area corresponding to the bead heel portion). In this area corresponding to the first and second sections, the angle θ formed by the cord of the wire chafer and the cord of the radial carcass is within a range between 35 degrees and 60 degrees in the first section and within a range between 40 degrees and 65 degrees in the second section so that the binding force of the wire chafer is optimized and shear strain of the rubber chafer, which is generated in the area corresponding to the bead heel portion when the tire is rotated under a load, is restrained.

Accordingly, a breakdown due to separation at the boundary surface between the rubber chafer and the wire chafer can be effectively prevented. That is, a breakdown due to separation of the rubber chafer can be effectively prevented.

When the angle θ formed by the cord of the wire chafer and the cord of the radial carcass is less than the lower limit in the respective sections, the effect of suppressing the shear strain of the rubber chafer is hardly obtained. On the other hand, when the angle θ exceeds the upper limit in the respective sections, the bending stiffness of the bead portion in the radial direction cannot be assured and the gap between the cords of the wire chafer becomes so small (the cords sometimes overlap with each other) that the wire chafer is difficult to be manufactured.

The angle formed by the first side part of the bead core and the bead sheet portion of the regular rim is set within 2 degrees so as to suppress peak generation of contact pressure against the rim when the tire is rotated under a load, which enables to disperse the contact pressure against the rim. As a result, pressure distribution of the bead base portion and the bead sheet portion of the regular rim is equalized and friction force of the entire bead base portion is increased when the tire is rotated under a load so as to prevent or suppress sliding of the bead portion of the tire with respect to the rim.

It is noted that a tire is mounted on a standard rim specified by the standards of JATMA (Japan), TRA (United States) and ETRTO (Europe) depending on its size, which standard rim is generally referred to as a regular rim.

In the present specification, according to this conventional reference, "the regular rim" indicates a standard rim having an applicable size defined in YEAR BOOK published in 2004 by the Tire and Rim Association (TRA) in the United States. Similarly, "the regular load" and "the regular internal pressure" respectively indicate the maximum load and the air pressure for the maximum load in an applicable size ply rating defined in YEAR BOOK published in 2004 by TRA. In this connection, the load means a maximum load (maximum load capacity) of a single wheel having an applicable size regulated by the standards mentioned below, internal pressure means air pressure for the maximum load (maximum load capacity) of a single wheel having an applicable size regulated by the standards mentioned below and the rim means a standard rim having an applicable size regulated by the standards mentioned below, that is approved rim or recommended rim.

The above-mentioned standards are regulated by industrial standards effective in the areas where the tire is manufactured or used. For example, the standards refer to "YEAR BOOK of The Tire and Rim Association Inc." in the United States, "STANDARDS MANUAL of The European Tyre and Rim Technical Organisation" in Europe and "JATMA Year Book of The Japan Automobile Tyre Manufacturers Association, Inc." in Japan.

A pneumatic radial tire for heavy loads according to claim 2 of the present invention is a pneumatic radial tire for heavy loads according to claim 1, wherein the cross-sectional shape of the bead core in the width direction of the tire is a hexagon, in which the first side part and an opposite side part thereof are parallel, the wire chafer is provided at a region around an outer side of the radial carcass corresponding to at least one of a third, forth, fifth and sixth section, the third section lying from the second end part to a third end part which is an outer end of the opposite side part in the width direction of the tire, the forth section lying from the central part of the first side part to a forth end part which is an inner end of the first side part in the width direction of the tire, the fifth section lying from the forth end part to a fifth end part which is an inner end in the width direction of the tire, and the sixth section lying from a sixth end part which is an inner end of the opposite side part in the width direction of the tire to the fifth end part, and the angle θ formed by the cord of the wire chafer and the cord of the radial carcass is within a range between 35 degrees and 50 degrees in the third section, within a range between 30 degrees and 55 degrees in the forth section, within a range between 40 degrees and 55 degrees in the fifth section and within a range between 45 degrees and 65 degrees in the sixth section.

Next, the operation and effect of the pneumatic radial tire for heavy loads according to claim 2 will be described. In the case where the wire chafer is provided, for example, in each section corresponding to the third, forth, fifth and sixth sections of the bead core, the angle θ formed by the cord of the wire chafer and the cord of the radial carcass can be adjusted depending on shear strain applied to the rubber chafer of the respective sections to further optimize the binding force of the wire chafer and to further restrain shear strain of the rubber chafer in the area corresponding to the bead heel portion when the tire is rotated under a load. Accordingly, it is possible to further effectively prevent a breakdown due to separation at the boundary surface between the rubber chafer and the wire chafer.

A pneumatic radial tire for heavy loads according to claim 3 of the present invention is a pneumatic radial tire for heavy loads according to claim 1 or 2, wherein the wire chafer is plurally divided in the cross-section of the tire.

Next, the operation and effect of the pneumatic radial tire for heavy loads according to claim 3 will be described. If the wire chafer is manufactured, for example, by an integral molding, the angle of the cords of the wire chafer varies among the first to sixth sections so that it is difficult to adjust the angle of the cords with a high accuracy. To the contrary, if the wire chafer is manufactured by being divided into the first to sixth sections along the circumferential direction of the tire, it is easy to adjust the angle of the cords of the wire chafer in each section with a high accuracy.

A pneumatic radial tire for heavy loads according to claim 4 of the present invention is a pneumatic radial tire for heavy loads according to any one of claims 1 to 3, wherein a protruding portion extending along the circumferential direction of the tire is provided in a rim flange-contacting portion of the bead portion in a bead heel side and radially inside of a gravity center of the bead core in the cross-section in the width direction of the tire.

Next, the operation and effect of the pneumatic radial tire for heavy loads according to claim 4 will be described. The rubber chafer receives larger shear strain in the rim flange-contacting portion of the bead portion in the bead heel side and radially inside of the gravity center of the bead core in the cross-section in the width direction of the tire. That is, in the rim flange-contacting portion, the rubber of the rubber chafer is fluidly deformed from the bead base portion to the bead heal portion and fluidly deformed outwardly in the radial direction of the tire. The protruding portion extending along the circumferential direction of the tire is provided in the rim flange-contacting portion so that contacting reaction of the protruding portion and the rim flange can restrain the rubber from being extruded and fluidly deformed from the bead base portion to the bead heal portion and thus restrain the rubber from being fluidly deformed outwardly in the radial direction of the tire. Accordingly, it is possible to further effectively prevent a breakdown due to separation at the boundary surface between the rubber chafer and the wire chafer.

The contact pressure of the protruding portion and the rim flange is increased with the increase of the load generated when the tire is rotated, so that the bead portion of the tire from sliding with respect to the rim can be further prevented or restrained.

The rim flange as used herein means an area, as viewed in the width section of the tire, lying from a point where the rim starts extending in the radially outward direction over the bead sheet portion of the regular rim to a point where the rim finishes extending in the radially outward direction, and the rim flange-contacting portion means an area where the bead portion and the rim flange contact with each other.

A pneumatic radial tire for heavy loads according to claim 5 of the present invention is a pneumatic radial tire for heavy loads according to any one of claims 1 to 4, wherein the angle formed by the bead sheet portion of the regular rim and the first side part is 0 degree.

Next, the operation and effect of the pneumatic radial tire for heavy loads according to claim 5 will be described. The angle formed by the first side part of the bead core and the bead sheet portion of the regular rim is set to 0 degree so that pressure distribution of the bead base portion and the bead sheet portion of the regular rim is further equalized and friction force of the entire bead base portion is further increased when the tire is rotated under a load. As a result, the bead portion of the tire is prevented or restrained from sliding with respect to the rim.

A pneumatic radial tire for heavy loads according to claim 6 of the present invention is a pneumatic radial tire for heavy loads according to any one of claims 1 to 5, wherein a deformation absorbing rubber layer having a JIS A-hardness larger than that of coating rubber of the radial carcass and less than that of the rubber chafer is provided between the radial carcass and the rubber chafer.

Next, the operation and effect of the pneumatic radial tire for heavy loads according to claim 6 will be described. In the pneumatic radial tire for heavy loads of the present invention, even when the rubber chafer receives the above-mentioned shear strain in the bead portion, especially in the area corresponding to the bead heal portion when the tire is mounted on the rim or when the tire is rotated under a load, for example, the deformation absorbing rubber layer provided between the radial carcass or the wire chafer and the rubber chafer is dragged by the rubber chafer to be largely deformed between the radial carcass or the wire chafer and the rubber chafer so that it is possible to restrain shear strain of the rubber chafer. Accordingly, it is possible to further effectively prevent a breakdown due to separation at the boundary surface between the rubber chafer and the radial carcass or the wire chafer.

The pneumatic radial tire for heavy loads of the present invention can more effectively prevent a breakdown due to separation of the rubber chafer in the area corresponding to the bead heal portion than before.

BRIEF DESCRIPTION OF THE DRAWINGS

FIG. 2 is a development view of the wire chafer shown in FIG. 1.

FIG. 3 is a widthwise sectional view of one of the bead portion of the pneumatic radial tire for heavy loads according to the first embodiment showing in a state where the tire is mounted on the rim.

FIG. 4 is a widthwise sectional view of one of the bead portion of the conventional pneumatic radial tire.

Figure 1:
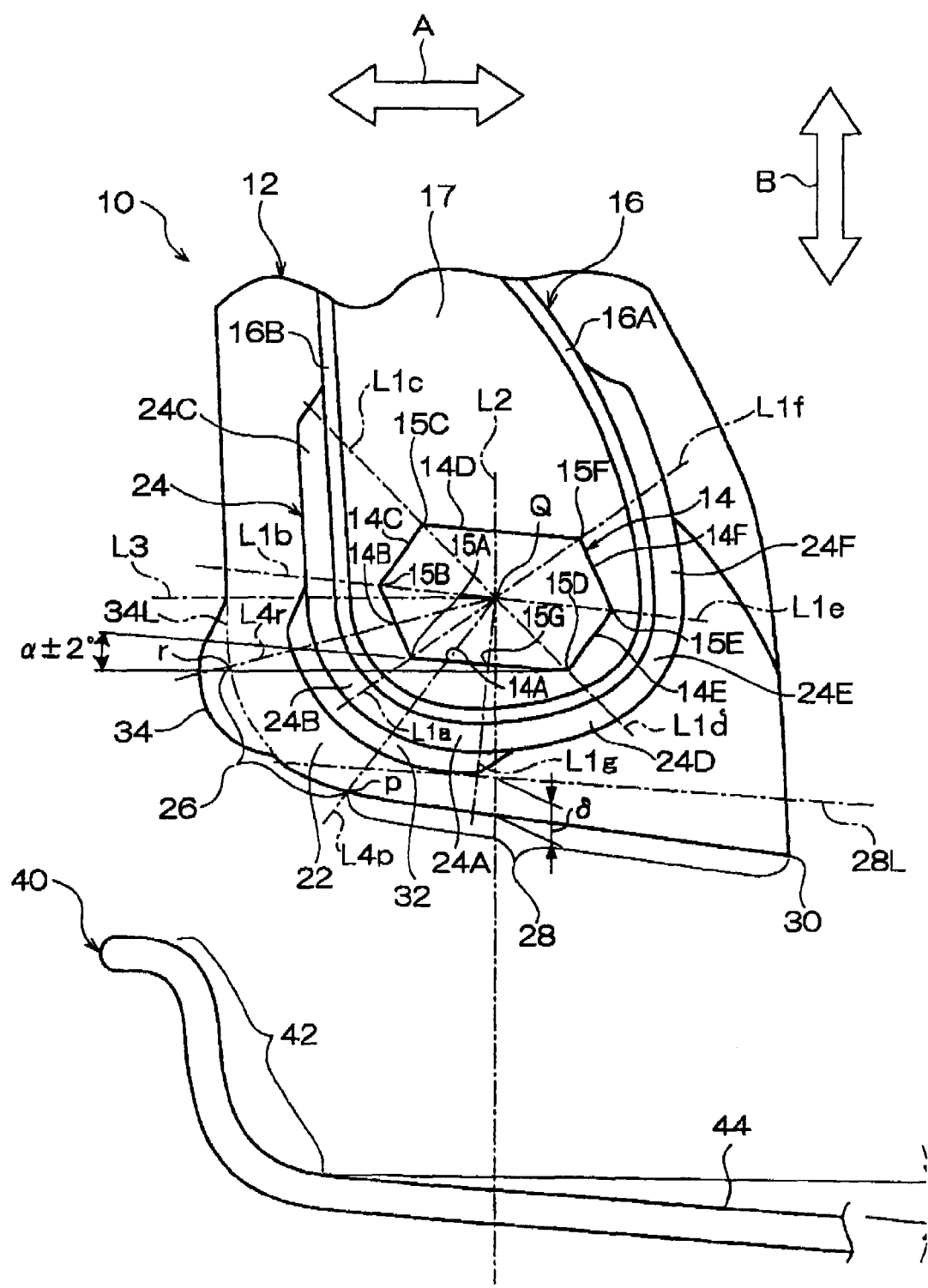
FIG. 1 is a widthwise sectional view of one of the bead portion of the pneumatic radial tire for heavy loads according to the first embodiment.

| | |
|---|---|
| 10 | tire (pneumatic radial tire for heavy loads) |
| 12 | bead portion |
| 14 | bead core |
| 16 | radial carcass |
| 22 | rubber chafer |
| 24 | wire chafer |
| 26 | bead heal portion |
| 32 | deformation absorbing rubber layer |
| 34 | protruding portion |
| 40 | regular rim |
| 42 | rim flange portion |
| 44 | bead sheet portion |
| Q | gravity center |

BEST MODE FOR CARRYING OUT THE INVENTION

First Embodiment

The first embodiments of a pneumatic radial tire for heavy loads according to the present invention will be described with reference to FIGS. 1 to 3. The arrows A and B shown in FIGS. 1 to 3 respectively indicate the width and radial directions of the tire.

In FIG. 1, a pneumatic radial tire (hereinafter referred to as a tire) 10 for heavy loads according to the first embodiment has a pair of bead portions 12 (only one is shown in FIG. 1), a bead core 14 which is embedded in each of the bead portions 12 and a radial carcass 16 extending from one bead portion 12 to the other bead portion 12 and turned around the bead core 14 from an inner side to an outer side of the bead portion 12 in a width direction of the tire to be anchored. The radial carcass 16 consists of a plurality of rubber-coated carcass ply cords 16S extending in the radial direction of the tire and disposed with a given spacing therebetween.

A belt 18 (not shown) consisting of a plurality of belt layers are provided in the outer side of the radial carcass 16 in the radial direction of the tire and tread rubber 20 (not shown) is provided in the outer side of this belt 18 in the radial direction of the tire. In addition, a stiffener 17 (not shown) for assuring high stiffness of the bead portion 12 is provided in an area surrounded by a body portion 16A and a turning portion 16B of the radial carcass 16. The stiffener 17 gradually decreases its thickness outwardly in the radial direction of the tire (in the direction of the arrow A).

A rubber chafer 22 is disposed over the radial carcass 16 in the opposite side of the bead core 14. The rubber chafer 22 extends from the inner side of the bead core 14 in the width direction of the tire toward a side portion of the tire. As shown in FIG. 1, the end portion of the bead portion 12 located innermost in width and radial directions of the tire is regarded as a bead toe portion 30, the line portion extending outwardly in the width direction of the tire from the bead toe portion 30 is regarded as a bead base portion 28, and a circular curve from a start point p, which is the end portion located in the outer side of the bead base portion 28 in the width direction of the tire, to an end point r is regarded as a bead heal portion 26, wherein the center of the circle of curvature lies in the bead portion 12 side.

Although, in this embodiment, the bead base portion 28 is the line portion, in other embodiments, the bead base portion 28 may be a curve portion or a bending portion instead of the line portion.

The bead core 14 has a cross-sectional shape of a hexagon in the width direction of the tire and the hexagon has a first side part 14A located innermost in the radial direction of the tire, a second side part 14B radially outwardly extending from a first end part 15A which is an outer end of the first side part 14A in the width direction of the tire, a forth side part 14D which is parallel to the first side part 14A, a third side part 14C connecting a second end part 15B which is an outer end of the second side part 14B in the radial direction of the tire and a third end part 15C which is an outer end of the forth side part 14D in the width direction of the tire, a fifth side part 14E extending inwardly in the width direction and outwardly in the radial direction of the tire from a forth end part 15D which is an inner end of the first side part 14A in the width direction of the tire and a sixth side part 14F connecting a fifth end part 15E which is an outer end of the fifth side part 14E in the radial direction of the tire and a sixth end part 15F which is an inner end of the forth side part 14D in the width direction of the tire.

The center of the first side part 14A in the width direction of the tire is defined as a central part 15G, the section lying from the central part 15G to the first end part 15A is regarded as a first section, the section lying from the first end part 15A to the second end part 15B is regarded as a second section, the section lying from the second end part 15B to the third end part 15C is regarded as a third section, the section lying from the central part 15G to the forth end part 15D is regarded as a forth section, the section lying from the forth end part 15D to the fifth end part 15E is regarded as a fifth section and the section lying from the fifth end part 15E to the sixth end part 15F is regarded as a sixth section.

Assuming that an angle formed by a bead sheet portion 44 of a regular rim 40 and the axial direction of the tire is defined as a, as shown in FIG. 1, the angle formed by the first side part 14A and the axial direction of the tire is set within $\alpha \pm 2°$. The regular rim 40 and the bead sheet portion 44 will be described later.

A wire chafer 24 corresponding to the first to sixth sections of the bead core 14 is provided adjacent to the outer side of the radial carcass 16 in the bead portion 12. The wire chafer 24 consists of a plurality of rubber-coated steel cords 24S disposed with a given spacing therebetween.

The linear virtual line (dot chain line) extending from the gravity center Q of the bead core 14 through the first end part 15A across the wire chafer 24 is defined as a virtual line L1a. A virtual line L1b extending though the second end part 15B, a virtual line L1c extending though the third end part 15C, a virtual line L1d extending though the forth end part 15D, a virtual line L1e extending though the fifth end part 15E, a virtual line L1f extending though the sixth end part 15F and a virtual line L1g extending though the central part 15G are defined in the similar manner. The sections of the wire chafer 24 sectioned by the virtual lines correspond to respective sections of the bead core 14. The section of the wire chafer 24 corresponding to the first section (surrounded by the virtual lines L1a and L1g) of the bead core 14 is defined as a first section 24A. Similarly, the section of the wire chafer 24 corresponding to the second section (surrounded by the virtual lines L1a and L1b) is defined as a second section 24B, the section of the wire chafer 24 corresponding to the third section (surrounded by the virtual lines L1b and L1c) is defined as a third section 24C, the section of the wire chafer 24 corresponding to the forth section (surrounded by the virtual lines L1g and L1d) is defined as a forth section 24D, the section of the wire chafer 24 corresponding to the fifth section (surrounded by the virtual lines L1d and L1e) is defined as a fifth section 24E and the section of the wire chafer 24 corresponding to the sixth section (surrounded by the virtual lines L1e and L1g) is defined as a sixth section 24F.

As shown in FIG. 2, when the angle formed by the carcass ply cord 16S (only one cord is shown in FIG. 2) of the radial carcass 16 and the steel cord 24S of the wire chafer 24 is defined as θ, the value of θ is preferably set within a range between 35 degrees and 60 degrees in the first section 24A, within a range between 40 degrees and 65 degrees in the second section 24B, within a range between 35 degrees and 50 degrees in the third section 24C, within a range between 30 degrees and 55 degrees in the forth section 24D, within a range between 40 degrees and 55 degrees in the fifth section 24E and within a range between 45 degrees and 65 degrees in the sixth section 24F.

The distance in the radial direction of the tire between an intersection of the bead base portion 28 on the linear virtual line L2 (dot chain line) extending from the gravity center Q in the radial direction of the tire and the virtual line L2, and the bead base portion 28L apparently compressed when the tire is mounted on the regular rim 40 and the virtual line L2 is defined as the fastening margin δ.

The linear virtual line (dot chain line) extending from the gravity center Q of the bead core 14 through the start point p of the bead heel portion 26 is defined as a virtual line L4a and the linear virtual line (dot chain line) extending through the end point r is defined as a virtual line L4b as well. In the present embodiment, the section surrounded by the virtual lines L4a and L4b is regarded as an area corresponding to the bead heel portion 26.

A protruding portion 34 is provided in an area of a bead heel portion 26 side of the bead portion 12 contacting a rim flange portion 42 and radially inside of the linear virtual line L3 (dot chain line) extending from the gravity center Q of the bead core 14 in the width direction of the tire. The protruding portion 34 extends along the circumferential direction of the tire and is made of rubber having the same hardness as that of the rubber chafer 22 in this embodiment. In FIG. 1, the boundary line between the rubber chafer 22 and the protruding portion 34 is shown as a virtual line 34L (two-dot chain line). In other embodiments, the protruding portion 34 may have different hardness as that of the rubber chafer 22. As shown in FIG. 1, the rim flange portion 42 means an area lying from a point where the rim starts extending in the radially outward direction over the linear bead sheet portion 44 of the regular rim 40 to a point where the rim finishes extending in the radially outward direction, and the area contacting the rim flange portion 42 means an area where the bead portion 12 and the rim flange portion 42 contact with each other.

A deformation absorbing rubber layer 32 having a JIS A-hardness larger than that of coating rubber of the wire chafer 24 and less than that of the rubber chafer 22 is provided between the wire chafer 24 and the rubber chafer 22. In this embodiment, the deformation absorbing rubber layer 32 is provided between the wire chafer 24 and the rubber chafer 22 as well as in the area surrounded by the virtual lines L1b and L1g. However, in other embodiments, the deformation absorbing rubber layer 32 may be provided in any areas, as long as it is provided between the rubber chafer 22 and the radial carcass 16.

(Operation) Next, the operation of the pneumatic radial tire 10 for heavy loads according to this first embodiment will be described. The rubber chafer 22 receives the largest shear strain in an area corresponding to the bead heel portion 26 and therefore, it is required to optimize a biding force of the wire chafer 24 in this area. In addition, the binding force of the wire chafer 24 is reduced when the angle θ formed by the steel cord 24S of the wire chafer 24 and the carcass ply cord 16S of the radial carcass 16 is either too small or close to 90 degrees.

Since the angle formed by the first side part 14A of the bead core 14 and the bead sheet portion 44 of the regular rim 40 is within 2 degrees, the first side part 14A and the bead sheet portion is generally parallel to each other and the first end part 15A of the bead core 14 is generally directed to the bead heel portion 26 side. Therefore, the rubber chafer 22 receives the largest shear strain in the first section 24A and the second section 24B of the wire chafer 24, which correspond to the first and second sections consisting of the first and second end parts 14A, 14B (that is, the first and second sections correspond to the area corresponding to the bead heel portion 26).

The angle θ formed by the steel cord 24S of the wire chafer 24 and the carcass ply cord 16S of the radial carcass 16 is within a range between 35 degrees and 60 degrees in the first section 24A and within a range between 40 degrees and 65 degrees in the second section 24B so that the binding force of the wire chafer 24 is optimized and shear strain of the rubber chafer 22 in the area corresponding to the bead heel portion 26 when the tire is rotated under a load is restrained.

Accordingly, a breakdown due to separation at the boundary surface between the rubber chafer 22 and the wire chafer 24 can be effectively prevented. That is, a breakdown due to separation of the rubber chafer 22 can be effectively prevented.

When the angle θ formed by the steel cord 24S of the wire chafer 24 and the carcass ply cord 16S of the radial carcass 16 is less than the lower limit in the respective sections, the effect of suppressing shear strain of the rubber chafer 22 is hardly obtained. On the other hand, when the angle θ exceeds the upper limit in the respective sections, bending stiffness of the bead portion 12 in the radial direction cannot be assured and the gap between the steel cords 24S becomes so small (the cords sometimes overlap with each other) that the wire chafer 24 is difficult to be manufactured.

The angle formed by the first side part 14A of the bead core 14 and the bead sheet portion 44 of the regular rim 40 is set within 2 degrees so as to suppress peak generation of contact pressure against the rim when the tire is rotated under a load, which enables to disperse the contact pressure against the rim. As a result, pressure distribution of the bead base portion 28 and the bead sheet portion 44 of the regular rim 40 is equalized and friction force of the entire bead base portion 28 is increased when the tire is rotated under a load so as to prevent or suppress sliding of the bead portion 12 of the tire with respect to the rim. When the angle formed by the first side part 14A of the bead core 14 and the bead sheet portion 44 of the regular rim 40 is set to 0 degree, the sliding with respect to the rim can be further prevented or suppressed.

In the case the wire chafer 24 is provided in each section corresponding to the third, forth, fifth and sixth sections of the bead core 14, the angle θ formed by the steel cord 24S of the wire chafer 24 and the carcass ply cord 16S of the radial carcass 16 is optimized in each section to further optimize the binding force of the wire chafer 24 and to further restrain shear strain of the rubber chafer 22 in the area corresponding to the bead heel portion 26 when the tire is rotated under a load. Accordingly, it is possible to further effectively prevent a breakdown due to separation at the boundary surface between the rubber chafer 22 and the wire chafer 24.

Dividing the wire chafer 24 plurally in the cross-section of the tire facilitates the optimization of the respective angles θ from the first to sixth sections of the wire chafer 24 in manufacturing the wire chafer 24. If the wire chafer 24 is manufactured by an integral molding, the angle of the steel cords 24S of the wire chafer 24 varies among the first to sixth sections so that it is difficult to adjust the angle of the steel cords 24S with a high accuracy. To the contrary, if the wire chafer 24 is manufactured by being divided into the first to sixth sections along the circumferential direction of the tire, it is easy to adjust the angle of the steel cords 24S of the wire chafer 24 in each section with a high accuracy.

The rubber chafer 22 receives larger shear strain in the area of the bead heel portion 26 contacting the rim flange portion 42 and radially inside of the gravity center Q of the bead core 14 in the cross-section in the width direction of the tire. That is, in the area, the rubber of the rubber chafer 22 is fluidly deformed from the bead base portion 28 to the bead heel portion 26 and fluidly deformed toward the outside in the radial direction of the tire. The protruding portion 34 extending along the circumferential direction of the tire is provided in this area so that contacting reaction of the protruding portion 34 and the rim flange portion 42 can restrain the rubber from being extruded and fluidly deformed from the bead base portion 28 to the bead heal portion 26 and thus restrain the rubber from fluidly deformed outwardly in the radial direction of the tire. Accordingly, it is possible to further effectively prevent a breakdown due to separation at the boundary surface between the rubber chafer 22 and the wire chafer 24.

As the load is increased when the tire is rotated, the contact pressure of the protruding portion 34 and the rim flange portion 42 is increased, further to prevent or restrain the bead portion 12 of the tire from sliding with respect to the rim.

Even when the rubber chafer 22 receives shear strain in the bead portion 12, especially in the area corresponding to the bead heal portion 26 when the tire is mounted on the rim or when the tire is rotated under a load, the deformation absorbing rubber layer 32 provided between the radial carcass 16 or the wire chafer 24 and the rubber chafer 22 is dragged by the rubber chafer 22 to be largely deformed between the radial carcass 16 or the wire chafer 24 and the rubber chafer 22 so that it is possible to restrain shear strain of the rubber chafer 22. Accordingly, it is possible to further effectively prevent a breakdown due to separation at the boundary surface between the rubber chafer 22 and the radial carcass 16 or the wire chafer 24.

Other Embodiments

In the first embodiment, the bead core 14 has a cross-sectional shape of a hexagon in the width direction of the tire. However, in other embodiments, the bead core 14 may have a cross-sectional shape of a polygon instead of a hexagon in the width direction of the tire.

In the first embodiment, the wire chafer 24 is plurally divided in the cross-section of the tire. However, in other embodiments, the wire chafer 24 may be integrally molded without divided in the cross-section of the tire. Alternatively, the wire chafer 24 may not be divided along the circumferential direction of the tire.

In the present embodiment, the angle of the steel cords 24S of the wire chafer is optimized. However, the angle of the carcass ply cords 16S of the radial carcass 16 may be varied.

Testing Example

In order to confirm the effects of the present invention, one kind of a conventional pneumatic tire and nine kinds of pneumatic tires according to the present invention as experimental tires are prepared and subjected to a test of running duration.

Each experimental tire having a tire size of 59/80R63 is mounted on a regular rim (a taper rim with 5°) defined by the TRA standards and applied the regular internal pressure. Settings of the experimental tires are shown in Table 1. In Table 1, "none" in the angle of the wire chafer means that the wire chafer is not disposed.

The test of running duration is preformed in such a manner that the experimental tire is pressed against a drum testing machine having a diameter of 5000 mm under the regular load and running at a speed of 8 km/h. The running distance until the tire is broken is measured. Then, the running distance of Example tires 1 to 9 is indexed with the running distance of Conventional example tire being defined as 100. The index values are shown in Table 2. The higher index value of the running duration means longer running duration.

TABLE 1

| | | Conventional Example | Example 1 | Example 2 | Example 3 | Example 4 | Example 5 | Example 6 | Example 7 | Example 8 | Example 9 |
|---|---|---|---|---|---|---|---|---|---|---|---|
| Average angle formed by cord of wire chafer and cord of radial carcass in each section [degree] | First section | 35 | 55 | 55 | 55 | 60 | 60 | 60 | 65 | 65 | 65 |
| | Second section | 33 | 41 | 41 | 41 | 46 | 46 | 46 | 51 | 51 | 51 |
| | Third section | 33 | 40 | 40 | 40 | 45 | 45 | 45 | 50 | 50 | 50 |
| | Forth section | 29 | 38 | 38 | 38 | 42 | 42 | 42 | 47 | 47 | 47 |
| | Fifth section | 35 | 45 | 45 | none | 50 | 50 | none | 55 | 55 | none |
| | Sixth section | 40 | 50 | 50 | none | 55 | 55 | none | 60 | 60 | none |
| Protruding portion on bead rear | | none | none | yes | yes | none | yes | yes | none | yes | yes |
| Deformation absorbing rubber layer | | yes | yes | yes | yes | yes | yes | yes | yes | yes | yes |

TABLE 2

| | Conventional Example | Example 1 | Example 2 | Example 3 | Example 4 | Example 5 | Example 6 | Example 7 | Example 8 | Example 9 |
|---|---|---|---|---|---|---|---|---|---|---|
| Running distance | 100 | 118 | 150 | 176 | 128 | 161 | 190 | 138 | 175 | 206 |

As apparent from the test results in Table 2, the pneumatic radial tires for heavy loads according to Examples 1 to 9 of the present invention have longer running duration than the pneumatic radial tire for heavy loads according to Conventional example.

The invention claimed is:

1. A pneumatic radial tire for heavy loads comprising:
a pair of bead portions in each of which a bead core is embedded;
a radial carcass extending from one bead portion to the other bead portion and turned around the bead core from an inner side to an outer side of the bead portion in a width direction of the tire to be anchored; and
a rubber chafer disposed over the radial carcass in the opposite side of the bead core and extending at least from the inner side of the bead core in the width direction of the tire toward a side portion of the tire,
wherein a cross-sectional shape of the bead core in the width direction of the tire is a polygon having a first side part located innermost in a radial direction of the tire and a second side part radially outwardly extending from a first end part which is an outer end of the first side part in the width direction of the tire;
an angle formed by a bead sheet portion of a regular rim and the first side part when the tire is mounted on the regular rim is within 2 degrees;
a wire chafer is provided at a region around an outer side of the radial carcass corresponding to a first section and a second section as viewed in the width direction of the tire,
the first section lying at least from a central part of the first side part in the width direction of the tire to the first end part; and
the second section lying from the first end part to a second end part which is an outer end of the second side part in the radial direction of the tire; and
an angle θ formed by a cord of the wire chafer and a cord of the radial carcass is within a range between 35 degrees and 60 degrees in the first section and within a range between 40 degrees and 65 degrees in the second section;
and wherein the cross-sectional shape of the bead core in the width direction of the tire is a hexagon, in which the first side part and an opposite side part thereof are parallel;
the wire chafer is provided at a region around an outer side of the radial carcass corresponding to at least one of a third, forth, fifth and sixth section;
the third section lying from the second end part to a third end part which is an outer end of the opposite side part in the width direction of the tire;
the forth section lying from the central part of the first side part to a forth end part which is an inner end of the first side part in the width direction of the tire;
the fifth section lying from the forth end part to a fifth end part which is an inner end in the width direction of the tire; and
the sixth section lying from a sixth end part which is an inner end of the opposite side part in the width direction of the tire to the fifth end part;
the angle θ formed by the cord of the wire chafer and the cord of the radial carcass is within a range between 35 degrees and 50 degrees in the third section, within a range between 30 degrees and 55 degrees in the forth section, within a range between 40 degrees and 55 degrees in the fifth section and within a range between 45 degrees and 65 degrees in the sixth section; and
the angle θ varies among the first to sixth section.

2. A pneumatic radial tire for heavy loads according to claim 1, wherein the wire chafer is plurally divided in the cross-section of the tire.

3. A pneumatic radial tire for heavy loads according to claim 1, wherein a protruding portion extending along the circumferential direction of the tire is provided in a rim flange-contacting portion of the bead portion in a bead heel side and radially inside of a gravity center of the bead core in the cross-section in the width direction of the tire.

4. A pneumatic radial tire for heavy loads according to claim 1, wherein the angle formed by the bead sheet portion of the regular rim and the first side part is 0 degree.

5. A pneumatic radial tire for heavy loads according to claim 1, wherein a deformation absorbing rubber layer having a JIS A-hardness larger than that of coating rubber of the radial carcass and less than that of the rubber chafer is provided between the radial carcass and the rubber chafer.

6. A pneumatic radial tire for heavy loads according to claim 1, the angle θ increases gradually from the fourth section to the sixth section.

7. A pneumatic radial tire for heavy loads according to claim 2, the angle θ increases gradually from the fourth section to the sixth section.

8. A pneumatic radial tire for heavy loads according to claim 3, the angle θ increases gradually from the fourth section to the sixth section.

9. A pneumatic radial tire for heavy loads according to claim 4, the angle θ increases gradually from the fourth section to the sixth section.

10. A pneumatic radial tire for heavy loads according to claim 5, the angle θ increases gradually from the fourth section to the sixth section.

* * * * *